United States Patent
Gustafson et al.

(10) Patent No.: US 11,052,313 B2
(45) Date of Patent: Jul. 6, 2021

(54) USING CONNECTION QUALITY HISTORY TO OPTIMIZE USER EXPERIENCE

(71) Applicant: Sony Interactive Entertainment LLC, San Mateo, CA (US)

(72) Inventors: Jason Gustafson, Sunnyvale, CA (US); Ryan Hamilton Breed, Laguna Niguel, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 146 days.

(21) Appl. No.: 16/272,860

(22) Filed: Feb. 11, 2019

(65) Prior Publication Data

US 2019/0168119 A1 Jun. 6, 2019

Related U.S. Application Data

(63) Continuation of application No. 15/052,835, filed on Feb. 24, 2016, now Pat. No. 10,207,185.

(60) Provisional application No. 62/129,765, filed on Mar. 7, 2015.

(51) Int. Cl.
| | |
|---|---|
| *A63F 9/24* | (2006.01) |
| *A63F 13/493* | (2014.01) |
| *H04L 29/08* | (2006.01) |
| *A63F 13/30* | (2014.01) |
| *A63F 13/355* | (2014.01) |
| *A63F 13/48* | (2014.01) |

(52) U.S. Cl.
CPC .......... *A63F 13/493* (2014.09); *A63F 13/30* (2014.09); *A63F 13/355* (2014.09); *A63F 13/48* (2014.09); *H04L 67/141* (2013.01); *H04L 67/306* (2013.01); *H04L 67/327* (2013.01); *A63F 2300/534* (2013.01); *A63F 2300/535* (2013.01)

(58) Field of Classification Search
CPC ...... A63F 13/493; A63F 13/355; A63F 13/48; A63F 13/30; A63F 2300/534; A63F 2300/535; H04L 67/141; H04L 67/327; H04L 67/306
See application file for complete search history.

(56) References Cited

U.S. PATENT DOCUMENTS

| | | | |
|---|---|---|---|
| 9,602,360 B1 * | 3/2017 | Greenfield | H04L 41/22 |
| 2007/0002057 A1 * | 1/2007 | Danzig | A63F 13/63 345/473 |
| 2013/0137518 A1 * | 5/2013 | Lucas | A63F 13/79 463/42 |
| 2013/0151651 A1 * | 6/2013 | Chhaochharia | A63F 13/358 709/214 |
| 2013/0344966 A1 * | 12/2013 | Mustafa | A63F 13/12 463/42 |
| 2014/0089384 A1 * | 3/2014 | Diaz | H04W 72/048 709/203 |

(Continued)

*Primary Examiner* — Dmitry Suhol
*Assistant Examiner* — Carl V Larsen
(74) *Attorney, Agent, or Firm* — Penilla IP, APC

(57) ABSTRACT

Methods and systems for assigning a data center to service a request from a user account include receiving a login request to a cloud gaming server. The login request is examined to identify a user account. A use history of the cloud gaming server is examined to identify a data center. The user account is assigned to the data center to start a session of streaming game play at a server within the data center. The data center is identified without performing a connection testing operation.

17 Claims, 7 Drawing Sheets

(56) References Cited

U.S. PATENT DOCUMENTS

2015/0182857 A1\* 7/2015 Kuo .................. A63F 13/25
                                                                           345/420
2015/0375113 A1\* 12/2015 Justice ............... A63F 13/77
                                                                           463/42

\* cited by examiner

USING CONNECTION QUALITY HISTORY TO OPTIMIZE USER EXPERIENCE

CLAIM OF PRIORITY

This application is a Continuation Application under 35 U.S.C. § 120 of U.S. patent application Ser. No. 15/052,835, filed on Feb. 24, 2016, and entitled "Using Connection Quality History to Optimize User Experience," which claims priority from U.S. Provisional Patent Application No. 62/129,765, filed on Mar. 7, 2015, and entitled "Using Connection Quality History to Optimize User Experience." The aforementioned applications are incorporated herein by reference in their entirety for all purposes.

FIELD

The present disclosure relates to systems and methods for providing games for user interaction, and more specifically to providing fast access to a game for cloud gaming.

BACKGROUND

Description of the Related Art

One of the rapidly growing technologies is in the field of cloud gaming. Users are able to access a number of games on a cloud gaming site over a network, such as the Internet, and begin interaction/playing the game. A user accesses his/her account on the cloud gaming site and selects a game from a list of games that are available for the user account, for game play. When the user selects a game for viewing and/or game play, the user will have to wait till the cloud gaming site identifies a data center that is closest to the user on which the game code is to be executed, and then for the selected game to load, before the user is provided access to the game for game play. The data center is identified by conducting a pre-test of the user's connections against several data centers to determine which data center provides the optimal connection speed for the user's game play. The pre-testing step causes additional wait for the user and can be detrimental to the game developer as the additional wait may lead to the user losing interest in the game and stopping interactions with the game site, resulting in a potential loss to the game developer/game site owner.

It is within this context that embodiments of the invention arise.

SUMMARY OF THE INVENTION

Embodiments of the present invention disclose methods and systems that are used for providing faster access to a game available on a game cloud server, so as to allow instant game play of the game. When a user accesses the game cloud system and requests to play a game, the system, in one embodiment, uses historic game play data of the user to determine the data center that was previously used to provision the game for the user's game play and such historic game play data identifies connections that were based on previous connection tests. In another embodiment, the system may obtain stream quality data from previous streaming play sessions to determine the data center that can be used to service the current request from the user. The game that the user requests for game play is a game that the user interacted with previously. The system routes the user's request to the identified data center, so as to allow instant access to the game for game play. Since the data center was already used to service the user's previous requests of the game and, therefore, includes an instance of the game, there is no wait time for servicing the user's request. Further, as the user continues to return to the game, it is evident that the processing resources previously provided by the data center has been sufficient to allow game play by the user, so as to have an optimal or a satisfactory game play experience. After allocating the data center, in one embodiment, a quality-of-service test is performed periodically, during the user's gaming session, to ensure that the assigned data center provides the required processing resources and the connection speed for the user's current game play. In another embodiment, the quality-of-service test is performed by continuously monitoring the data transmissions between the client device used for game play and the assigned data center to ensure the desired resource quality and connection speed are maintained. The embodiments provide ways to allocate the data center to service the user's game play request by leveraging on the previous user game play performance at the data center.

In one embodiment, a method is provided, which includes receiving a login request to a cloud gaming server and examining the login request to identify a user account. The method includes examining a use history associated with the user account, over a period of time, wherein the use history for the user account is available at the cloud gaming server. The examination of the use history is used to identify a datacenter that was previously assigned to service the user's request and to assign the user account to the datacenter to start a session of streaming game play with the cloud gaming server. The datacenter is identified without performing a connection testing operation. In one configuration, the connection testing operation is performed after the session of streaming game play is started and the connection testing is performed using game data from the current game play. In another configuration, the datacenter is identified using a prediction process that determines which data center amongst a plurality of datacenters would provide an optimal connection speed for a type of game play processed by the user account or at least is similar to connection speed provided by data center(s) in prior sessions.

Information about the previous game play performance is maintained in a user history database and a data center history database. Historical information provided in these history databases may include connection quality history, connection test results, network routes used, network characteristics, geo location of users, geo location of data centers, connection speed required, connection speed provided, processing resources required, processing resources provisioned, each resource's expected performance, each resource's actual performance during game play, performance use of game play by a user, such as graphics used, display presented, game scene intensity, level of the game being played, mode of game play (multiplayer or single, shared or un-shared, etc.), time of week and/or day selected for game play, etc. The historical information is used to determine connection quality and performance quality so as to provide similar or better game play performance to optimize the user's experience. Based on the historic game play performance, the data center is allocated to service the user's request. After allocating the data center first, quality-of-service testing is performed with streaming data content from current game play to ensure that the quality of the data center and the connection are up to the level that is expected for the user's request. When the quality is not up to the level expected/desired, the system may either perform a switching of the data center and/or may elect to reduce the resolution of the game data so that the user is provided with a satisfactory game play experience.

Traditionally, allocating a data center required the system to perform a pre-test to determine which one(s) of the data centers available to the game cloud system had the necessary processing resources and the connection speed (i.e., bandwidth) to service the request. Based on the results of the pre-test, a data center was selected that was geographically closest to the user to allow the user to have optimal playing experience. A user had to wait for the pre-testing to complete before the user was allowed access to the game. Further, if the data center that was identified had the processing and communication resources (i.e., connection speed) required to service the request of the user but lacked an instance of the game at any of the servers within the data center, the user was forced to wait for additional period for the game code of the game to be instantiated on at least one of the servers within the identified data center, before access to the game was given to the user. Such waiting may discourage the user from coming back, as the time to access the game for game play is too long. The various embodiments of the present invention provide for instant access to the game for game play while performing necessary quality-of-service (QoS) test after the allocation to ensure that the quality of the game is not compromised.

In one embodiment, a method is provided. The method includes receiving a request from a user at a cloud gaming site. The request is received from a user account. In response to the request, gaming history maintained for the user account is analyzed to identify a game for game play and a gaming profile of the user. The gaming profile of the user provides sufficient information to identify a data center within the cloud gaming site that was previously assigned for servicing past game play requests received from the user. The identified data center is assigned to service the request from the user. The assignment of the data center causes a communication connection to be established between a server available within the identified data center and a computing device from where the request was initiated, to allow game play of the game. After assigning the data center, connection attributes of the communication connection established between the computing device of the user and the server of the identified data center are verified to ensure that the identified data center performs in accordance to connection requirements expected for servicing the request. The verification may result in the switching of the data center for servicing the request from the assigned data center to a new data center when it is determined that the connection attributes of the assigned data center falls short of the connection requirements necessary for servicing the request.

In another embodiment, a system is disclosed. The system includes a cloud gaming server that provides a plurality of games for game play. The cloud gaming server is configured to service a game play request received from a user. The cloud gaming server executes a connection module. The connection module, in response to a request received from a user account, is configured to analyze gaming history maintained for the user account to determine gaming profile of a user initiating the request. A performance predictor engine within the connection module is configured to predict one or more connection attributes required for servicing the request by analyzing the gaming history of the user. A data center selection engine within the connection module is configured to analyze data center history maintained for each of the data centers within the cloud gaming site to identify the data center that was assigned for servicing past requests of game play from the user, wherein the identified data center included the necessary resources to satisfy the connection attributes required for servicing the previous requests of game play from the user. The data center identified by the data center selection engine is assigned for servicing the request from the user, wherein the assigning causes communication connection to be established between a server from the identified data center and a computing device of the user from where the request was initiated, so as to allow game play of the game.

In some embodiments, the cloud gaming site further includes a quality-of-service (QoS) engine that is configured to verify connection attributes of the communication connection established between the computing device of the user and the server identified in the data center. The QoS engine is configured to generate a signal to switch to a second data center, when the communication connection established between the computing device of the user and the data center does not meet the connection attributes required for servicing the request.

In some embodiments, a gaming history database is provided to collect and update user account metrics associated with the user account of one or more users with information from the game play of the games.

In some embodiments, a data center history database is provided to collect and update data center metrics associated with the data center with information from the request, upon servicing the request from one or more users.

In another embodiment, a computer-readable medium with computer executable instructions stored thereon is disclosed. The computer-readable medium includes program instructions for receiving a request from a user account, wherein the request identifies a game for game play; program instructions for analyzing gaming history maintained for the user account to identify a gaming profile of the user, wherein the gaming profile provides information to identify a data center available within the cloud gaming site that was previously assigned for servicing prior requests for game play of the game received from the user; program instructions for assigning the data center to service the request from the user, the program instructions for assigning includes program instructions for causing a communication connection to be dynamically established between a server in the data center and a computing device of the user from where the request was initiated, so as to allow game play of the game; and program instructions for verifying connection attributes of the communication connection, after assigning the identified data center, to determine that the identified data center performs in accordance to connection requirements expected for servicing the request from the user. The program instructions for verifying further includes program instructions for switching data center for servicing the request when the connection attributes of the assigned data center falls short of the connection requirements necessary for servicing the request.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
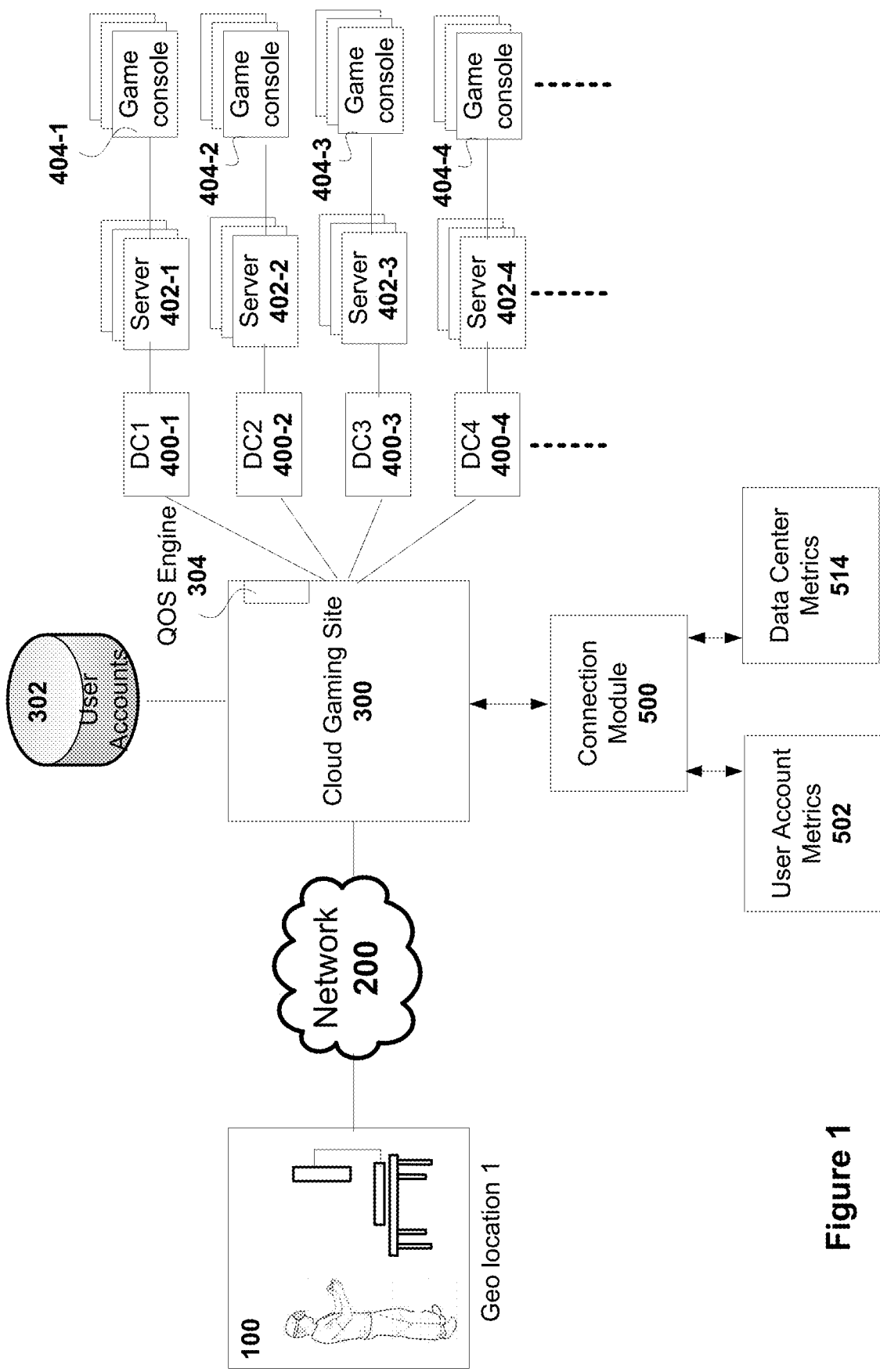
FIG. 1 illustrates a simplified block diagram of an exemplary system that is used to assign data center available to a cloud gaming site for servicing a request for game play received from a user, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to an embodiment of the present invention a user may access a cloud gaming site through a user account at the cloud gaming site and select a game available within the cloud gaming site for game play. In response to the request, a gaming history of the user maintained in the cloud gaming site or on a local server, a remote server or anywhere else on the cloud, and accessed through the cloud gaming site, is analyzed to determine the user's gaming profile. The gaming profile identifies the user's preference of games at different game play period, including day of the week, time of day, etc., performance use of the games, including graphics of the selected game, display preference, intensity of game play, game level preference, geo location of user when the game request is initiated, etc. The gaming profile is used to identify a data center of the cloud gaming site that was assigned to service past requests for game play of the game received from the user. The identified data center is assigned to service the current request from the user. The assignment causes a server of the identified data center to dynamically establish a communication connection with a computing device of the user that initiated the request, to allow game play. After assignment and during game play, the connection attributes of the communication connection between the computing device and the server of the identified data center are verified by conducting quality-of-service tests to determine if the connection attributes meet connection requirements expected for servicing the request from the user. If the communication connection does not meet the connection requirements expected for servicing the request from the user, the data center assigned to service the request of the user is switched to a second data center that can provide the communication resources that meets the connection attributes required for servicing the request.

In some embodiments, the geo location and/or time characteristics provided in the gaming profile of the user may be used to determine which data center to assign the request from the user. Generally, users that are local to a particular geo location are served by the same internet service provider (ISP) and/or will all have similar connection attributes for a particular game, for example. Using the time-local (current or recent) streaming data from such users that share the same ISP and/or the geo location of a user initiating the request, it is easy to predict connection attributes for the request from the initiating user and to identify the data center for assigning the request from the user for servicing. In such embodiments, if sufficient connection attributes data from other users in the same ISP/geo location are available, quality-of-service connection test that is performed after allocation of the data center may be entirely avoided, further saving time during verification of connection attributes of the request while providing the connection with the required connection resources between the data center in the cloud gaming site and the computing device from which the user initiates the request.

A cloud gaming site as used in this application is a local server, a virtual computer, a cloud server, a digital media store, a storefront of a game developer/game sponsor, a website, a remote server, a game console on a cloud server, or any other content provider store/site that is capable of hosting one or more game applications (including providing/allocating processing resources for executing the game application) that users can access and interact during game play.

After establishing the connection between the assigned data center and the computing device of the user, the connection attributes are monitored using the data from the current game play. If the connection attributes of the connection meet the expected connection requirements, the identified data center is used to continue servicing the request from the user. If, however, the connection attributes fall short of the expected connection requirements, then the data center may be switched so as to provide optimal gaming experience for the user. The connection attributes may include one or more processing resources or the connection speed provided by the communication connection between the computing device of the user and the server of the data center that was assigned to service the request of the user. In some embodiments, the processing resources provided at the data center may exceed the performance requirements necessary for servicing the request or may exceed the performance use of the user. In such embodiments, the processing resources allocated within the server may be adjusted to allow efficient servicing of the request while making optimal use of the processing resources.

After servicing the request from the user, the user's gaming profile within the gaming history may be updated with information from the game play of the game associated with the request. The gaming history will provide per game information, such as dates, time of day, performance use (i.e., how strong of a game a user had selected to play, how strong was the user's performance, etc.), etc., from which gaming profile of a user can be easily deduced. For example, a user's performance use may include graphics levels, display, scenes, game levels, single vs. multi-user play, etc. Similar to a gaming profile being maintained for each user in the gaming history, each data center may be associated with a data center profile that is maintained in a data center history within the cloud gaming site. The data center profile identifies the connection attributes that were used when requests were received from a plurality of users and serviced by the respective data center within the cloud gaming site. As each data center may service a plurality of users' requests at any given time, the data center profile of the respective data center is dynamically updated as and when user requests are being serviced. The data center profile of all the data centers and the gaming profile of all the users provide a rich source of historical information that can be used to route the user requests, so that the user is provided with proper processing and communication resources, including communication speed or bandwidth, to allow the user to have an enriching game playing experience. For example, from the information captured in the data center profile and user gaming profile, usage at certain times can be mapped for each game and for each user.

The various embodiments described herein avoid the connection test that is conducted by the traditional application before the user's request is assigned the necessary resources to begin game play. According to the traditional method, when a user request is received, the user request was examined to determine the game selected for game play. Upon identifying the game, connection test was performed to test the client device's connection to different data centers and to identify a data center that would provide the optimal connection speed for servicing the request of the user. In addition to the connection test, each data center's resources were determined to identify the data center that would provide the optimal processing resources as well as the connection speed. This pre-testing before allocating/assigning the data center resulted in the user having to wait before the user is provided access to the resources for playing the game. As the games become more graphic and/or performance intensive and requires more resources, the pre-testing may become more involved leading to more wait. This waiting may cause the user to lose interest in the game and to stop interacting with the game site, resulting in a potential revenue loss to the game developer/game site owner.

The current embodiments disclose a way to provide instant access to a game stream of a game to a user, in response to a request for game play from the user. The instant access is provided by assigning a data center that was used to service previous game play requests of the user. The data center is assigned without requiring a connection test to be performed for checking for processing resources and/or verifying connection speed between the data center and a client device of the user from where the request originated. The current embodiments enable fast allocation of the data center by keeping a history of the past connection test results, quality of connections when past requests were serviced, network routes and the network characteristics that were used for each game, for each user, for each data center and the geographical areas of users, and leveraging the history information with respect to the user and the data center to allocate the data center to service the user's request.

When a user's request for game play is received, one or more attributes of the user provided in the user's request, such as user identification, day of the week of the request, time of day of the request, etc., may be used to search the historical information on-the-fly to identify the game and the data center that was used previously for servicing the prior requests for game play of the game from the user, for different time periods specified in the prior requests. It should be noted that a single data center may have serviced all the prior game play requests for the game originating from the user or different data centers may have serviced the prior game play requests, depending on time of day when the prior game play requests were serviced. As a result, when servicing the current request of the user, the time of day when the request originated is taken into consideration in identifying the appropriate data center. The identified data center is assigned for servicing the current game request from the user. The assigning of the data center causes a communication connection to be dynamically established between a game server within the identified data center that includes the instantiated game and the computing device (i.e., client device) of the user from which the user request was initiated, so as to allow instant access to the streaming content of the game.

The connection speed testing and processing resource allocation testing is performed after the user begins interacting with the game play instance, and such testing is performed to ensure the assigned data center has the necessary resource and communication bandwidth to allow the user to have an optimal game play experience. The testing is performed using streaming game data packets that are being exchanged during current game play. During testing, when it is determined that the connection speed or other communication resources is not at the level required for the user to have an optimal gaming experience, a signal may be generated to initiate a switch in the data center assigned to service the user's game play request. Similarly, when it is determined that the processing resources allocated is below the required level, the server may be switched to a different server within the same data center or may be switched to a server in a different data center. Alternately, if the game is executing on a game console, a signal may be generated to switch the allocated game console to a different game console within the server and/or the data center or on a different server on a different data center. When it is determined that the processing resources allocated is more than the required level or more than what the user is using (based on the performance use of the user) during game play, the resources may be adjusted so that the processing resources are used optimally while providing a satisfying game play experience to the user. Such adjustment may include scaling down the processing resources allocated to service the game play request of the user.

In some embodiments, once the user is assigned the data center 400 and the game server 402 and/or game console 404 and begins playing the game, a quality-of-service (QoS) engine 304 within the cloud gaming site may periodically or continuously monitor the communication and processing bandwidth of the connection to ensure that the quality of the service is maintained at a required level for the user's request. During the course of game play or during the testing periods, the QoS engine 304 may determine that the bandwidth of data has begun to drop even while the intensity or quality of game play remains high or at the desired level. One reason for the connection bandwidth to drop may be due to the connection speed dropping on the communication line established between the computing device 100 of the user and the server 402 and/or game console 404 of the identified data center 400, either due to demand placed on the communication line or due to increase in the load of the data packets that are being transmitted. Of course, connection speed dropping is one example and there may be many other reasons why the connection bandwidth may drop. To maintain the quality, the quality-of-service (QoS) engine 304 within the cloud gaming site 300 may recognize the mismatch in the service quality expected to what is being provided, and send a signal to the game server to dynamically lower the resolution of the game data to address the mismatch so that the overall service is not adversely affected. Once the connection speed is restored, the resolution of the game data may be adjusted to the original level by sending another signal to restore the original resolution. The adjustment of the resolution is performed in a manner that does not adversely affect the user's gaming experience. With the general understanding of the invention, specific embodiments will now be described with reference to the various drawings.

FIG. 1 illustrates a simplified block diagram of a system used for identifying and assigning a data center to service a game play request from a user, in one embodiment of the invention. The system includes a client computing device 100 that is communicatively connected to the cloud gaming site 300 over a network 200, such as the Internet. When a request to access the cloud gaming site 300 is received from the client device 100, the cloud gaming site 300 accesses user account information stored in a user data store 302 to identify a user associated with the client device 100 from which the request is initiated.

In one embodiment, the cloud gaming site 300 may determine all the games the user is authorized to view/play, retrieve the game titles and return the game titles in a list for presenting on a display screen of the client device 100. User interaction at one of the game titles rendered on the client device 100 is detected and a signal is sent to the cloud gaming site 300. The signal includes user-related information, including the game title selected, user identifier, geo location of the user, day of week, date, time of day when the request was initiated, etc. In some embodiments, the geo location of the user may be determined using a Global Position System (GPS) mechanism within the client device 100, the client's IP address, the client's ping information, to name a few. Of course, the aforementioned ways to detect the geo location of the user may be exemplary and other types of mechanisms or tools may be used to determine the geo location of the user.

In response to the signal, a connection module 500 available to the cloud gaming site 300 proactively determines a data center that was used to service previous game play requests for the same game received from the user. The identified data center is known to include the required communication connection and processing resource bandwidth to service the previous requests from the user, as the user has had satisfactory game playing experience, which is evidenced by the user's repeat visit to the cloud gaming site and repeat selection of the game.

In another embodiment, once the identity of the user is determined from the request, the connection module (e.g., a quick-connect module) available to the cloud gaming site may predict the game selected for game play based on the user's gaming profile obtained from the historical information maintained by the connection module 500. The connection module 500 may use the information provided in the request, such as user identifier, time of day, day of week, to identify the user and use the identity of the user to obtain the gaming profile of the user. The gaming profile is used for predicting the game the user likes to play at specific periods of time. The connection module 500 may use information from the gaming profile of the user to further predict the performance requirement of the game, system requirement, geo location of the user, etc., and identify the data center that serviced previous requests of the game for the user.

The connection module 500 identifies the user's gaming profile by retrieving user account metrics 502 for the user account of the user. The connection module 500 maintains user account metrics 502 for each user account associated with each user that has requested game play of a game available at the cloud gaming site 300. The user account metrics 502 identifies the gaming history of the user by determining the games that the user has requested at the cloud gaming site 300, dates, time of day, performance use of each game requested/desired by the user, skill level of the user, etc. The performance use of the game that the user desires may further include graphics of the game, display option, graphic intensity of the scenes, level of game the user has mastered, level of game the user is currently playing, level of game the user likes to begin playing, mode of game play (multi-player or single user game play, share vs. unshared game play), etc. When the request for game play is received, the connection module retrieves the user account metrics 502 of the user on-the-fly using the user account information provided in the request to identify the gaming history of the user. The gaming history identifies a data center 400 as well as the resources within the data center 400 that was used for servicing the previous requests of the user for the same game.

The connection module 500 then retrieves the data center attributes for the identified data center from the data center metrics 514. The data center metrics 514 maintains the data center history for all the data centers 400 available at the cloud gaming site 300. The information in the data center metrics 514 is constantly updated as and when requests for one or more games is serviced by the corresponding data center 400 to provide a current status of the data centers 400 and the corresponding data center attributes (for e.g., type of processing resources available, status of each of the processing resources at a data center, etc.). The connection module 500 (e.g., a quick connect module) uses the retrieved data center attributes for the data center 400 identified by the user account metrics. The connection module 500 then passes the identified data center information, including the data center attributes to the cloud gaming site 300. The cloud gaming site 300 uses this information to send a signal to the data center 400 to establish a communication connection with the client device 100 and to allocate the processing resources specified in the retrieved data center attributes in order to service the user's game play request. It should be noted that since the data center 400 had previously serviced requests for the game, an instance of the game is already loaded and is available for servicing the request. As a result, there is no need to wait for the instance of the game to be loaded, thereby providing immediate access to the game to the user.

Based on the signal from the cloud gaming site 300, a game console 404 or game server 402 of the data center 400 that is executing the instantiated game, establishes a direct connection between itself and the client computing device 100 for allowing exchange of game play data between the game console 404 or game server 402 of the identified data center 400 and the client computing device 100. Once the communication connection is established, the user is provided access to begin game play of the selected game. During game play, a quality-of-service (QoS) engine 304 may monitor the level of service provided by the assigned data center 400 by testing the quality of service provided by the data center to determine if the quality of service meets the required level of service expected for the game for the user. In some embodiments, the quality of service testing may be performed at defined periods during game play. In alternate embodiments, the quality of service testing may be performed continuously during the game play. In some embodiments, the quality of service required for the game play may be specified in the user account metrics of the user. Based on the quality testing, the data center assigned to service the request may be kept or switched. In some embodiments, the quality testing checks for connection speed, for optimal allocation of resources, level of service provided by each of the resources, etc., and such testing is performed with actual game data exchanged between the client computing device and the data center from which the game data is being streamed to the client computing device.

Figure 2:
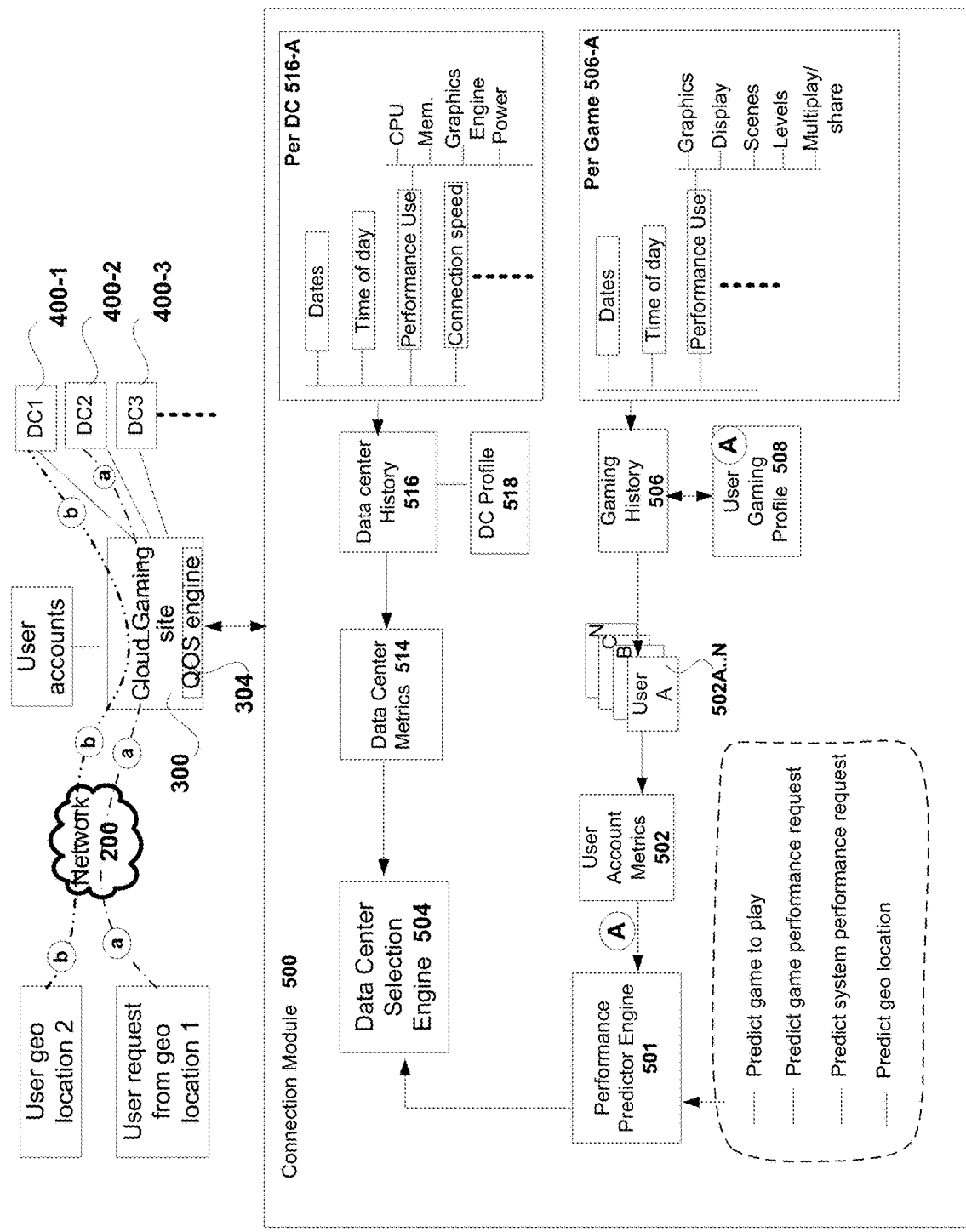
FIG. 2 illustrates an example connection module that is used to identify the data center for assigning a user's request for game play, in accordance to an embodiment of the present invention.

FIG. 2 illustrates the various modules within the connection module 500 that is used to identify and assign a data center 400 for servicing a user request for game play, in one embodiment of the invention. A user, user A, may initiate a request for game play of a game by logging into a user account at the cloud gaming server 300 that is accessed over the network 200. The request, as previously mentioned, may include user-related information, such as user identifier, game identifier, user's geo location, date, day of week, time of day, etc. A connection module 500 executing on the cloud gaming site 300 may receive the user request and may determine, on-the-fly, which data center to route the user A's request. To assist in determining the data center, the connection module 500 may engage a performance predictor engine 501. The performance predictor engine 501 uses the user account information provided in the request to query user account metrics 502 in order to obtain a gaming profile 508 of user A. The connection module 500 maintains gaming history 506 for every user account that is available at the cloud gaming site 300. The gaming history 506 may include gaming related information of each user for each game (506-A through 506-N), such as user identifier, game title selected, date of request, time of day of the request, performance use of the user, mode of game play, etc. In one embodiment, the information provided in the gaming history is used to determine the gaming profile 508 of the user for each game. In another embodiment, the information provided in the gaming history is used to determine the overall gaming profile of the user for all games. The overall gaming profile may identify the user's preference of games at different time periods, amount of time the user was engaged in playing the different games, etc. The connection module 500 generates user account metrics 502 for each user account (502A-502N) of a user that includes the gaming profile information 508 obtained from the gaming history 506. When the request from the user is received at the connection module 500, the performance predictor engine 501 determines user identifier of the user, date and time of day the user's current request was received, geo location of the user, etc. The performance predictor engine 501 then retrieves the user account metrics 502 for the user account identified from the request. The predictor engine 501 uses information in the user account metrics 502 to predict one or more predictive attributes of the request, such as the game that was normally selected for game play for the time of day identified from the user's current request, game performance and/or resource requirements (i.e., connection speed) for the game, system performance requirements for efficient game play of the game, the geo location of the user, to name a few. The aforementioned predictive attributes are exemplary and have been provided as an example. Other predictive attributes may be identified to assist in identifying the data center for servicing the request. In some embodiments, the predictor engine 501 may then weigh the predictive attributes based on a certainty value assigned for each predictive attribute gathered from the usage history defined in the user account metrics 502. For example, at the time of day associated with the request, if user A selected Game 3 for prior game plays 7 out of 10 times, then the certainty value for predictive attribute that identifies Game 3 for game play is about 70%.

The predictive attributes and their relative weight identified by the predictor engine 501 is forwarded to a data center selection engine 504. The data center selection engine 504 uses the predictive attributes to identify the geo location of the user and to predict the data center 400 for servicing the user's current request. The data center prediction may be based on the geo location and a history of data center assignment used for servicing a user's prior requests received at the same time of day as the current request. The data center selection engine 504 knows that the identified data center provided the required processing and communication resources for servicing the user's prior requests received for the time of day identified by the current request. The data center selection engine 504 then retrieves data center metrics 514 for the identified data center 400 to obtain the current status of processing resources available at the data center 400. The connection module 500 maintains data center history 516 of all data centers 400 available at the cloud gaming site 300. The data center history 516 maintains historical information of various requests serviced at each data center including dates each data center 400 serviced a request (for the game identified in the request or for any other game instantiating in the data center 400), time of day of such service, performance use of each processing resource, such as central processing unit (i.e., processor), memory, graphics engine, power, etc., available at the data center 400, connection speed, etc. The historical information 516 is used to determine the data center profile 518 for each data center, including the identified data center 400. The data center selection engine 504 then forwards the data center information for the identified data center 400 to the cloud gaming site 300, which sends a signal to the data center 400 instructing a game server or game control at the data center 400 to establish the connection with the client device 100 to service the request from the client device 100. After assigning the identified data center to service the user's current request, the data center selection engine 504 updates the data center metrics 514 of the identified data center 400 with the current request. The cloud gaming system thus assigns the data center based purely on prediction attributes provided by performance prediction engine 501 that relies on data center history and user gaming history, and runs the connection test after assigning the data center.

As and when requests from different users are serviced by the identified data center, the data center metrics for the identified data center is updated, so as to provide the current status of processing resources available at the identified data center 400. Similarly, user account metrics 502 of the user is updated with the request from the user, so as to provide a current gaming history of the user.

After the communication connection is established, a QoS engine 304 within the cloud gaming site 300 is engaged to monitor the connection and perform QoS testing to determine the quality of communication connection and to determine if the communication connection is at a desired level that is expected for servicing the request. In some embodiments, the QoS engine 304 performs a latency test, as part of the QoS testing, to test the quality of the communication connection established between the assigned data center and the client device of the user initiating the request. The QoS engine 304 identifies the game session, a communication socket used in establishing the communication connection, connection parameters used, communication connection line that was established between the user's client device and the assigned data center for exchanging communication during gaming. The QoS 304 engine also knows the connection requirements for the game. The QoS engine 304 uses the connection information and the connection requirements to determine if the quality of connection is up to the level required for the session for the game identified in the request.

When the QoS testing indicates that the quality is not at the level expected, the QoS engine 304 sends a signal to the cloud gaming site 300 to switch the data center 400, for example, in order to improve the communication connection. The quality of communication connection may suffer if, for example, the geo location of the user from where the request originated has changed from the predictive geo location identified by the predictor engine 501. The change in the user's geo location may cause increased latency during transmission of data between the client device 100 and the cloud gaming site 300. In such a case, the signal from the QoS engine 304 would trigger the cloud gaming site 300 to identify the current geo location of the user, on-the-fly, and identify an alternate data center that may be close to the current geo location of the user, for servicing the request. The alternate data center is identified based on availability of an instance of the game at the alternate data center so that there is no wait involved in accessing the game. Further, the alternate data center is selected such that it has sufficient processing and communication resources to service the request so that the game data can be streamed between the client device 100 and the alternate data center with minimal latency. The QoS testing is performed in the background using live data provided from current connection between the client device 100 and the cloud gaming system 300. By using the live data from the current game play, a more accurate status of the communication connection can be established.

This is different from the traditional approach where the QoS testing was done prior to allocation of data center, using random test data. Based on the background QoS testing using live data from the current game play, the cloud gaming system may maintain the connection to the assigned data center or re-route the connection to a different data center. The testing and switching (if needed) is done after the data center allocation has been done. This post-allocation testing allows a user to have faster access to the game while maintaining the level of service required for the request.

The cloud gaming system may perform the switching of the data center at a transition point defined for the game. For example, the transition point may be defined to be completion of a level of game play, or completion of current game play, etc. The switching can be performed in any number of ways. For example, the switching can be performed by stopping game play of the game and switching. In this example, the prior game play is discarded and a new game play is started, with the new game play being assigned to the switched data center. In another example, the game play of the game is paused and the data center is switched. In this example, when the game play is resumed, the data center assigned for game play will be the switched data center. In another example, the cloud gaming system may provide an option to a user for switching the data center. In this example, based on the user's response to the option, the data center used for game play may be switched. When the data center is switched in the middle of game play, the cloud gaming system may store the game state of the game from the old data center and load the game state of the game to a server in the switched data center, prior to allowing the user to resume his game play. The game state of the game would be the user-related game data.

Figure 3A:
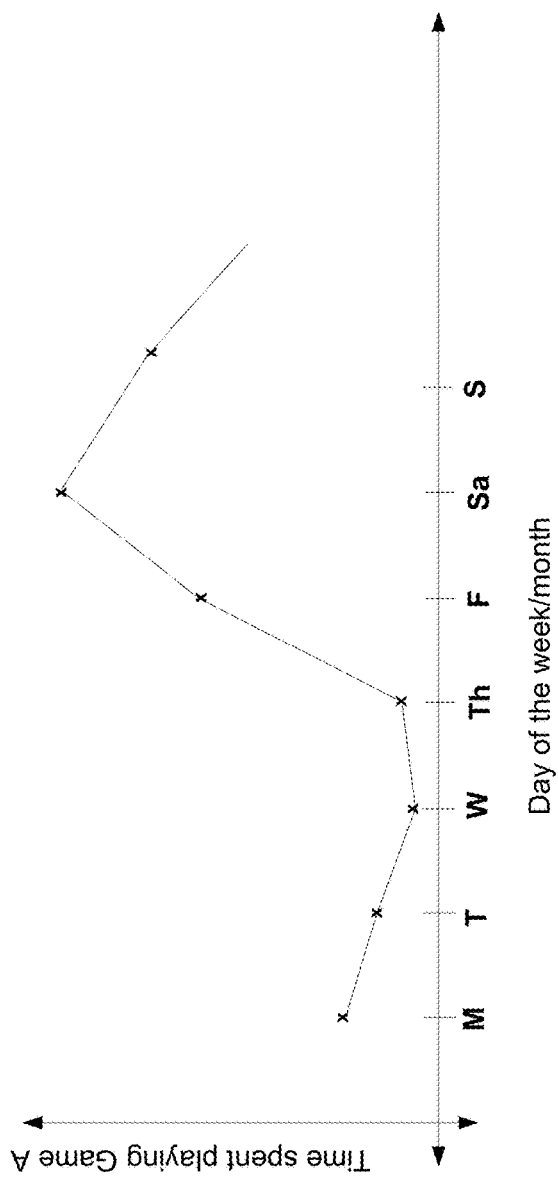
FIG. 3A illustrates a game usage graph that is used to determine gaming history of a user initiating a request for game play, in accordance with one embodiment of the present invention.
Figure 3B:
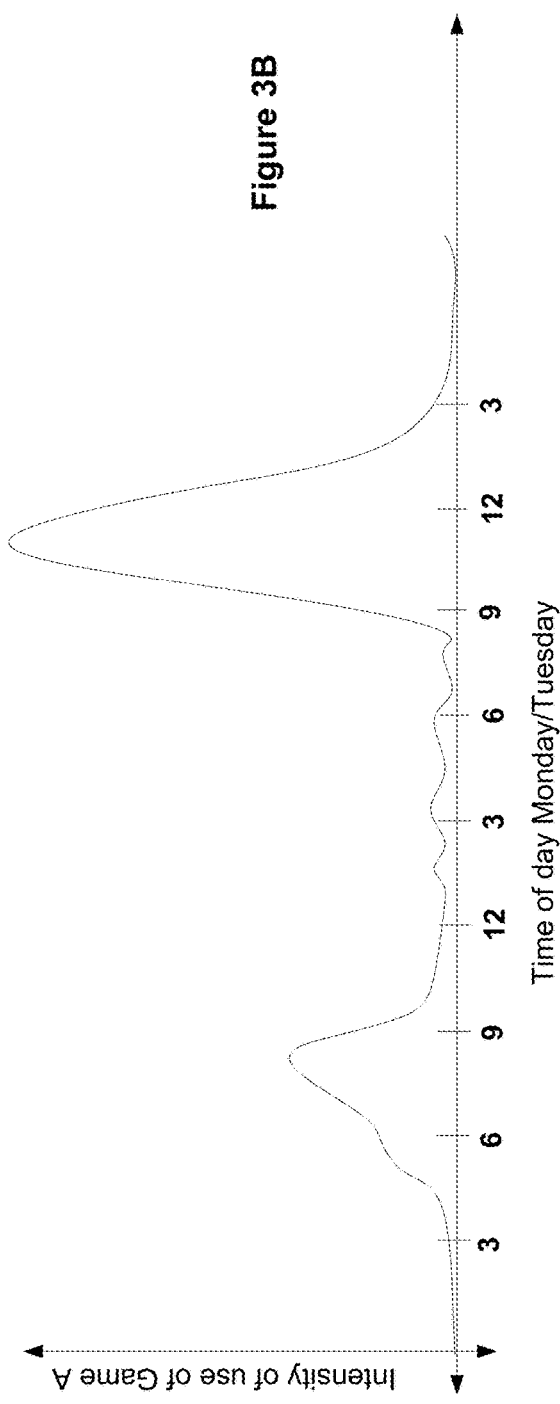
FIG. 3B illustrates game usage intensity graph that identifies usage intensity at different times of a sample day, in accordance to an embodiment of the invention.

FIG. 3A illustrates usage graph of the user for a game, in one embodiment of the invention. As illustrated, the user's usage may differ for different days of the week. The information provided by the usage graph may be used to generate the gaming profile of the user. Each point in the graph may be selected to provide an expanded view of usage intensity of the game, as shown in FIG. 3B. When a user selects a point that corresponds to Monday in FIG. 3A, the graph representing the game usage intensity of the user for different times within Monday and portions of Tuesday is rendered. This allows the system to identify the user's affinity or preferences to particular games and which game(s) the user likes to play at specific times to enable the predictor engine to provide more accurate predictive attributes of the game(s) to the data center selection engine. The predictive attributes are used to ensure that the identified data center has sufficient bandwidth to service the user's request, in order for the user to have a satisfying gaming experience. With the detailed description of the various embodiments, a method used for pre-loading games will now be described with reference to FIG. 4.

Figure 4:
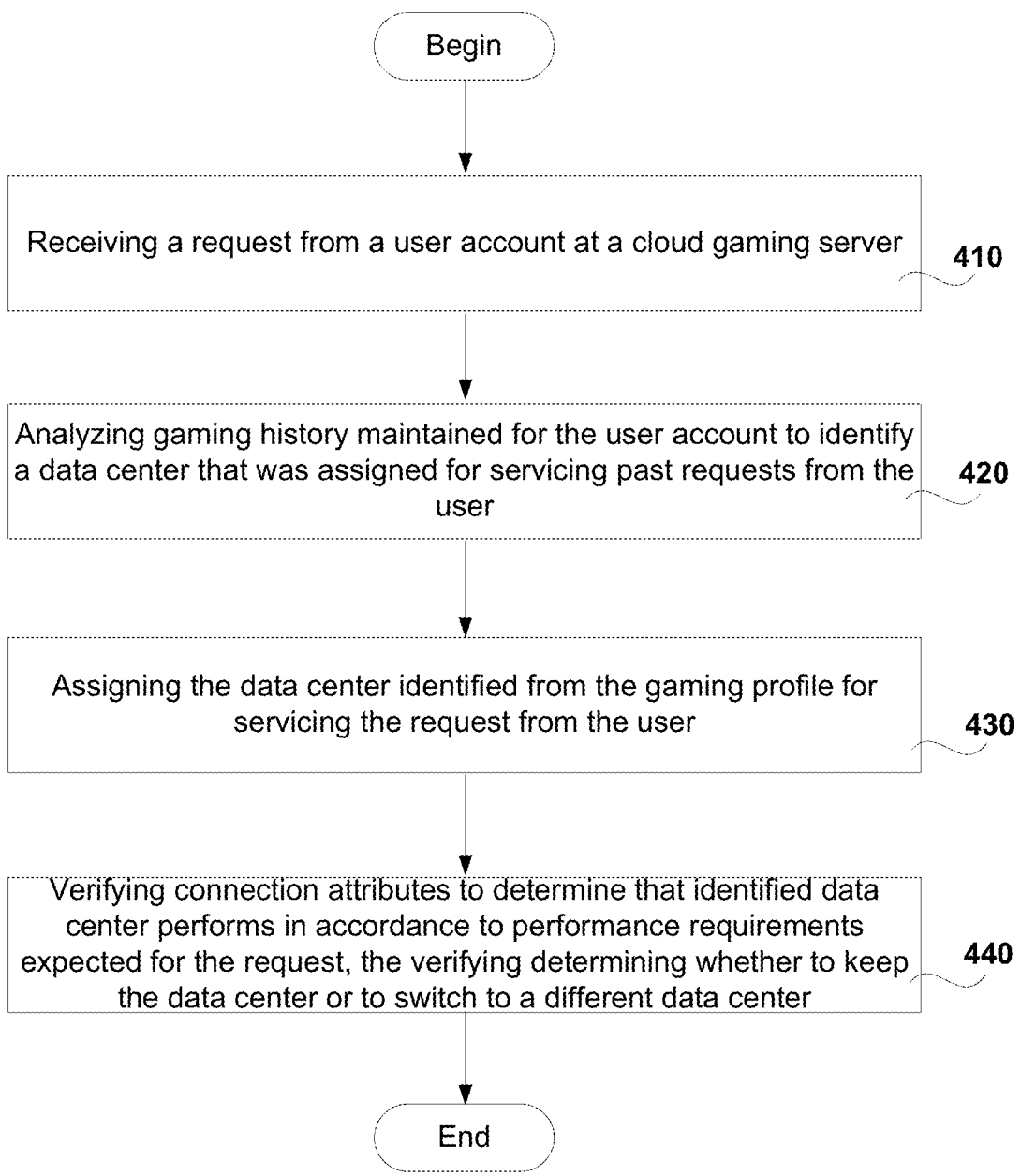
FIG. 4 illustrates the process operations involved in identifying a data center for servicing a request from a user, in accordance with one embodiment of the present invention.

FIG. 4 illustrates the various method operations for assigning a data center for servicing a request received from a user, in one embodiment of the invention. The method begins at operation 410, wherein a request to access the cloud gaming site is received from a user account at a cloud gaming site. In response to the request, a gaming history maintained for the user account is analyzed to determine a gaming profile of a user associated with the user account, as illustrated in operation 420. The gaming profile provides information that identifies the game the user usually plays at the time the request was received and a data center available within the cloud gaming site that was assigned for servicing past requests received from the user.

The data center identified in the gaming profile is assigned to provide instant service for the request from the user, as identified in operation 430. The assigning of the data center causes a communication connection to be established between a server from the identified data center and a client device of the user from where the request was initiated, so as to allow instant access to the game for game play. Connection attributes of the communication connection established between the server and the client device is monitored and verified, as illustrated in operation 440. The verification is performed after assigning the data center to service the request from the user, to ensure that the identified data center performs in accordance to connection requirements expected for servicing the request from the user. The verifying may cause switching of the data center for servicing the request, when it is determined that the connection attributes of the assigned data center falls short of the connection requirements necessary for servicing the request. Alternately, the verifying may result in the identified data center being retained for servicing the request, as it might be determined that the connection attributes of the assigned data center at least meets the connection requirements necessary for servicing the request. In some embodiments, when the connection attributes of the assigned data center exceed the requirements, one or more resources may be scaled back to ensure optimal allocation of resources. The various embodiments described herein provide an efficient way of allocating a data center to service a user request and such allocation is done prior to performing a connection test, so that the user is provide with instant access to the game. The connection test is performed after allocation to ensure that the quality of service and connection are performed at a level that is required for providing a satisfactory game play experience to the user.

Figure 5:
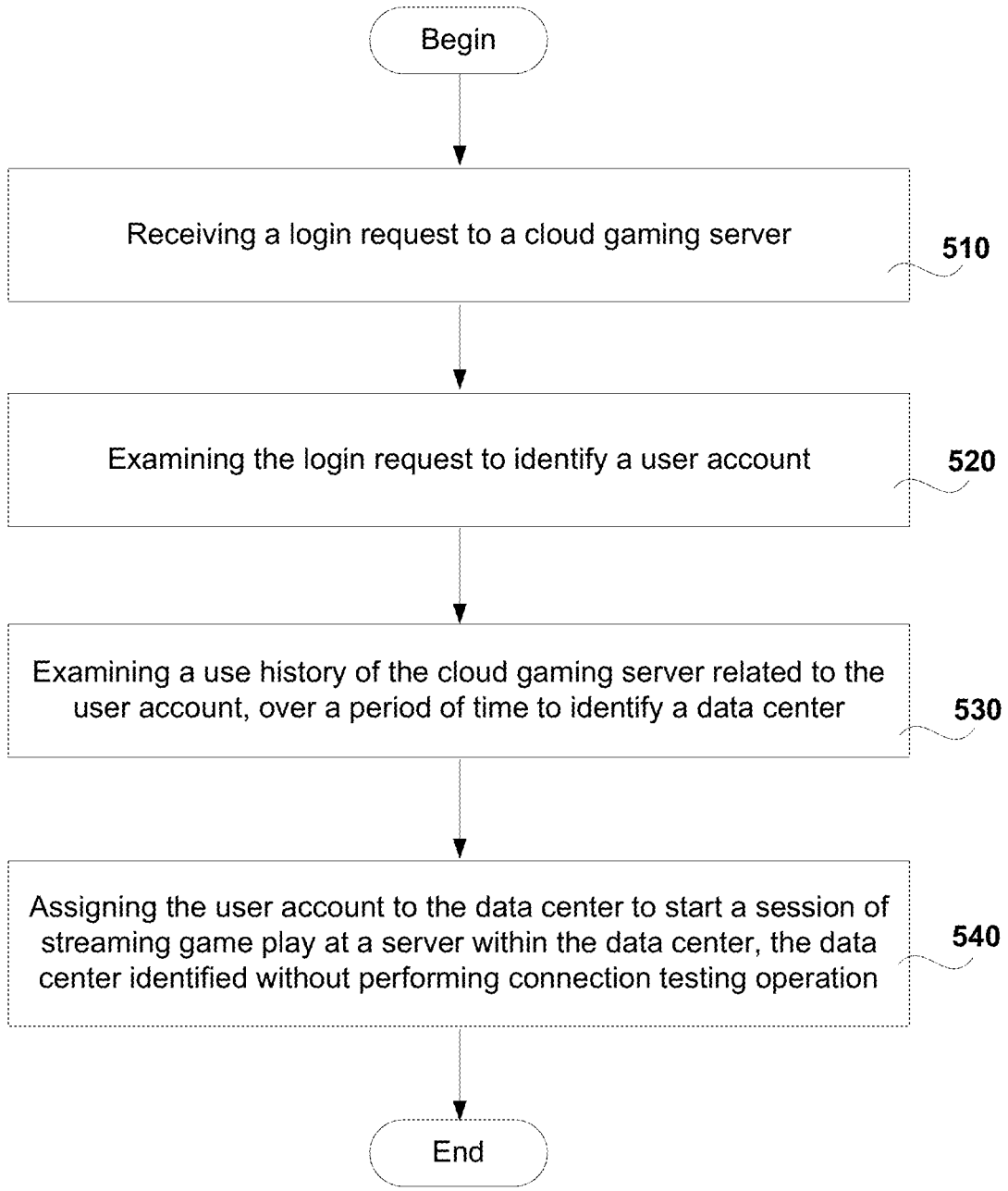
FIG. 5 illustrates the process operations involved in identifying a data center for servicing a login request from a user, in accordance with an alternate embodiment of the invention.

FIG. 5 illustrates method operations for assigning a data center for a request received from a user, in one embodiment of the invention. The method begins at operation 510 wherein a login request to a cloud gaming server is received. The login request is examined to identify a user account that is associated with the login request, as illustrated in operation 520. The cloud gaming server maintains user accounts of a plurality of users and when the login request is received, the cloud gaming server will verify the login request against the user accounts maintained locally to determine user identification information associated with the user account. The use history of the cloud gaming server related to the user account, is examined over a period of time, as illustrated in operation 530. The use history provides information related to the user account's prior accesses of the cloud gaming server including number of times the user account was used to access the cloud gaming server, time of access (including day, date), amount of time spent at the cloud gaming server, type of game selected for streaming game play, game title, etc. Information provided in the use history is used to identify a data center from a plurality of data centers available at the cloud gaming server, used to provide the necessary resources during prior streaming game play sessions for servicing the type of game identified in the login request.

Based on the examination of the use history of the cloud gaming server, the identified data center is assigned to the user account to allow the user account to start a session of streaming game play with a server within the data center, as illustrated in operation 540. The data center is assigned to the user account without performing any connection testing operation. In another embodiment, use history of a plurality of users from a geo location from where the login request is received, may be examined to identify a data center that services the user accounts. Usually, the user accounts at a geo location may be serviced by a single data center. In such embodiments, the user account identified in the login request may be assigned to the same data center identified from the user history of the plurality of users. Either way, the user account is assigned a data center to service the login request without performing any connection testing operation, so that the user associated with the user account is provided with faster access to start the streaming game play session. The connection testing operation, in one embodiment, is performed after the data center is assigned and the user session of game play has commenced. When the connection test reveals a less-than-satisfying experience at the allocated data center, the system proactively switches the data center so as to provide a satisfying game play experience to the user. The proactive switching may be based on current geo location of the user, available resources at the assigned data center as well as the switched data center, The advantages of assigning a data center to service a user's request prior to performing connection test, are numerous. For example, the user does not have to wait for the connection test to complete or the game code to load as the user is provided instant access to the game that is already loaded in a data center. The data center is assigned based on the user's prior interaction history related to the particular game or a plurality of games at the cloud gaming site. The assigned data center must have provided satisfactory game play experience, as evidenced by the user's repeat return to the cloud game server. Further, the quality of service provided by the identified data center is verified in the background during the game play session to ensure that the service quality is maintained at a level desired by the user. Other advantages will become obvious to one skilled in the art after reading the various embodiments described herein.

Figure 6:
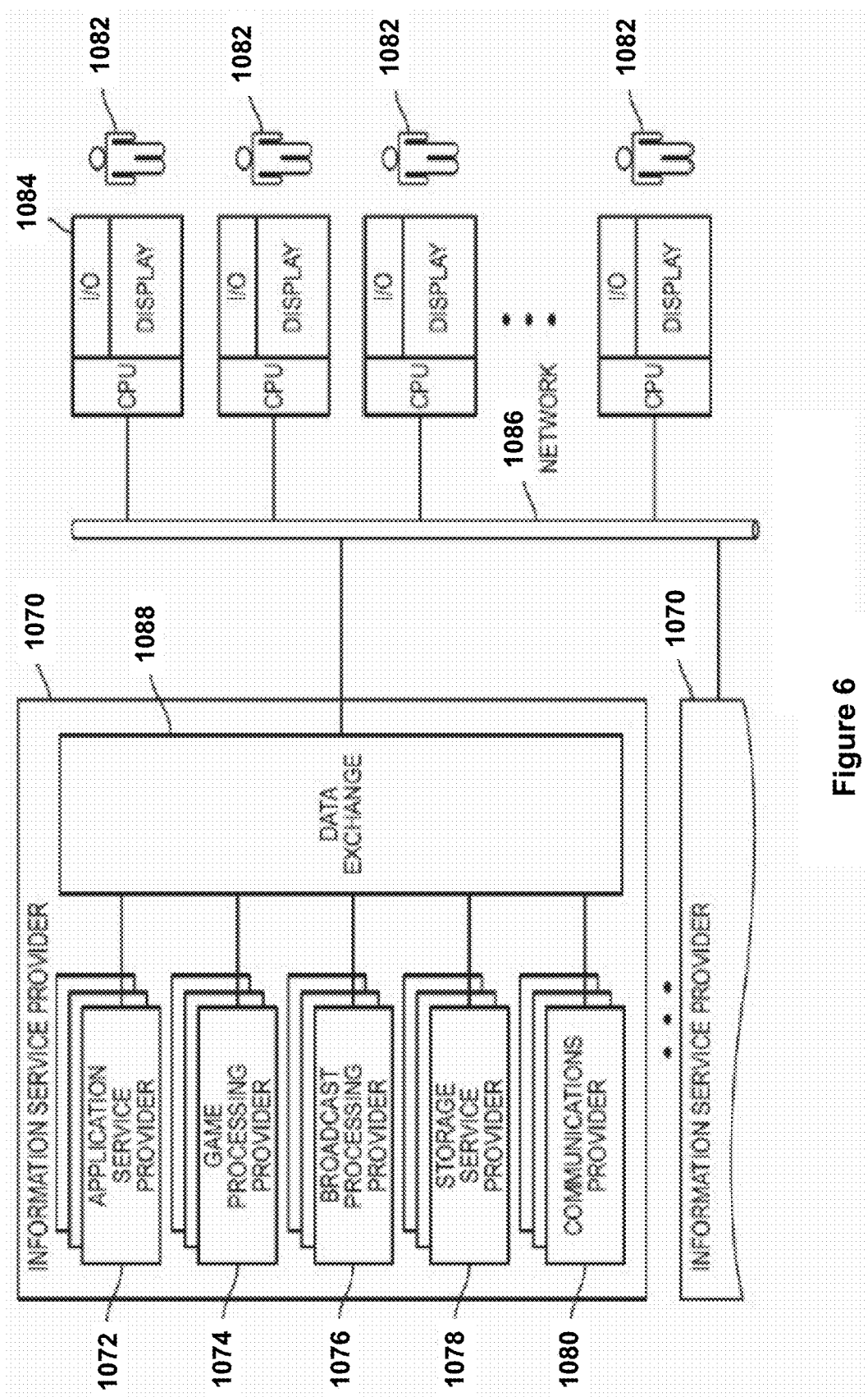
FIG. 6 illustrates an exemplary Information Service Provider architecture for delivering informational content and services to users who are geographically dispersed and connected via network, in accordance with one embodiment of the present invention.

FIG. 6 illustrates an embodiment of an Information Service Provider architecture that may be used in providing access to different games. Information Service Providers (ISP) 1070 deliver a multitude of information services to users 1082 geographically dispersed and connected via network 1086. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. For example, the application software resides on a vendor's system that is accessible by users through a web browser using HTML, by special purpose client software provided by the vendor, or other remote interface, such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independent of where the user is located or the device being used to access the data is located. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as HTML, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing invention has been described in some detail for purposes of clarity of understanding. It will, however, be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

Figure 7:
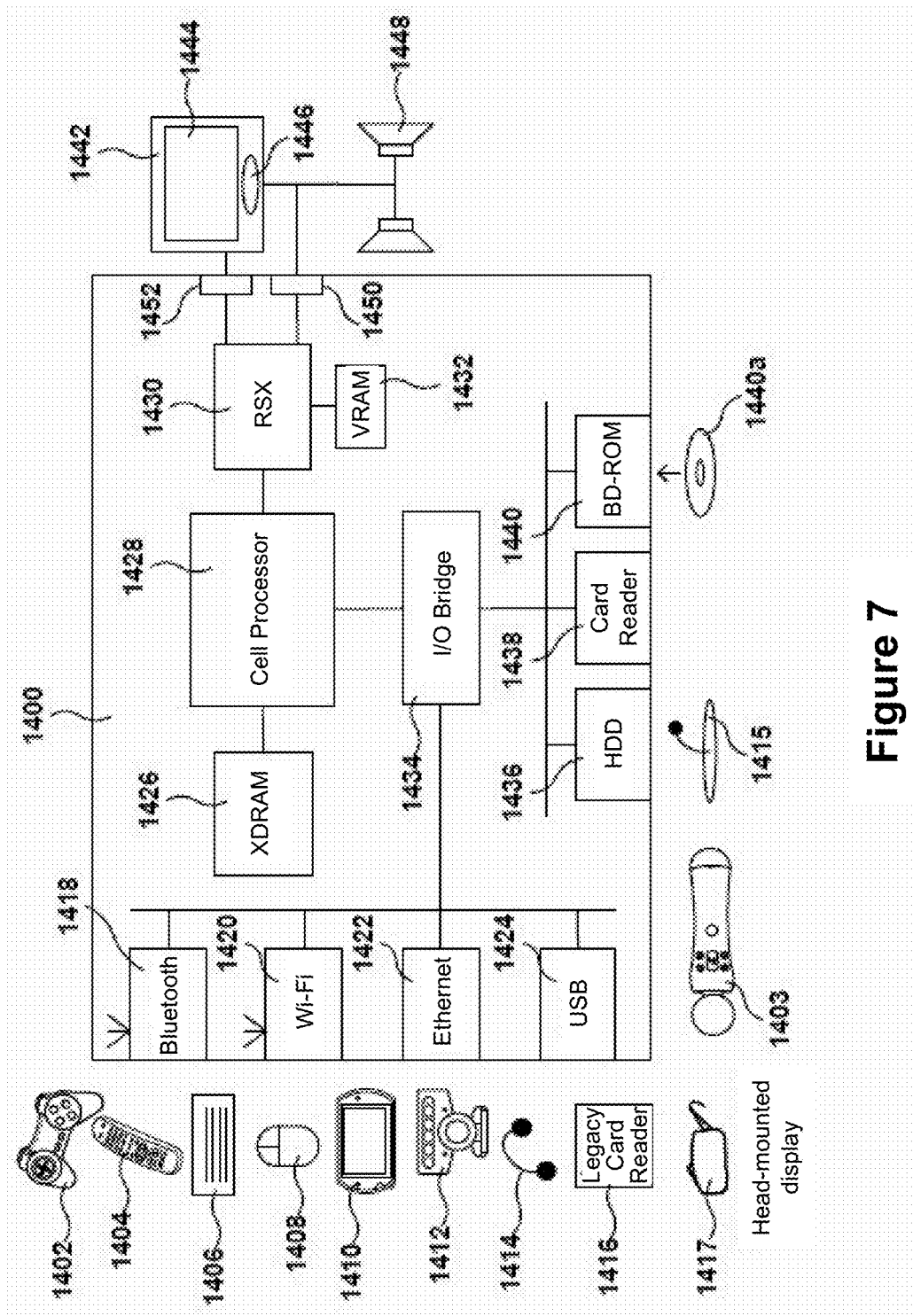
FIG. 7 illustrates exemplary components of a computing device used for controlling content presented to a user, in accordance with one embodiment of the invention.

FIG. 7 schematically illustrates the overall system architecture of a gaming console, such as Sony® Playstation 3® entertainment device, that may be compatible with controllers for implementing an embodiment of the present invention. A system unit 1400 is provided, with various peripheral devices connectable to the system unit 1400. The system unit 1400 is similar to the cloud gaming server 300 of FIG. 2. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation the I/O bridge 1434 handles all wireless, USB and Ethernet data, including data from one or more game controllers 1402-1403 and HMD 1417. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403 and HMD 1417, such as: a remote control 1404; a keyboard 1406; a mouse 1408; a portable entertainment device 1410 such as a Sony Playstation Portable® entertainment device; a video camera such as an PlayStation® Eye Camera 1412; and headphones 1414; and a microphone headset 1415. Such peripheral devices may therefore in principle be connected to the system unit 1400 wirelessly; for example the portable entertainment device 1410 may communicate via a Wi-Fi ad-hoc connection, while the headphones 1414 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners.

In addition, a legacy memory card reader 1416 may be connected to the system unit via a USB port 1424, enabling the reading of memory cards of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and Playstation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit (RSX) 1430, through audio 1450 and video 1452 connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the Point of Gaze (POG) of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
 receiving a request for accessing a cloud gaming system, the request originating from a user;
 analyzing use history of the user, in response to the request, to predict usage of a game and to identify a data center that was last used to play the game by the user, the identified data center having an instance of the game loaded on a server of the data center and available for assignment to the user;

assigning the instance of the game to the user, the assigning causing user data of the user to be associated with the instance of the game to enable interactivity with the game via a client device; and verifying performance level of a communication channel established between the server and the client device to confirm that the performance level meets a predefined metric for playing the game, the performance level being verified after initiating the play of the game, wherein verifying the performance level includes monitoring connection attributes of the communication channel established between the server of the data center and the client device, by performing a latency test using video frames generated during play of the game, the latency test performed in background during play of the game.

2. The method of claim 1, wherein the game is processed by the server of the data center in a streaming mode so as to stream video frames of the game to the client device, wherein the processing of the game includes processing of the user input received from the client device.

3. The method of claim 1, wherein verifying performance level includes generating a signal to the server of the cloud gaming system to switch the data center assigned to the user for playing the game to a new data center, when the performance level of the communication channel does not meet the predefined metric.

4. The method of claim 3, wherein the new data center is identified based on a current geo location of the user initiating the request, and availability of an instance of the game at a server of the new data center for assigning to the user.

5. The method of claim 3, wherein verifying performance level further includes, determining a quality of connection of the communication channel by comparing the connection attributes against the predefined metrics, the quality of connection determined by taking into account a threshold of latency defined for the game, wherein the signal generated to switch to the new data center is based on the quality of connection.

6. The method of claim 5, wherein the connection attributes of the communication channel is affected by a geo location of the user, such that the connection attributes of the communication channel is different in a new geo location than the connection attributes at a geo location identified in the use history of the user.

7. The method of claim 3, wherein the switching to the new data center is done at a transition point defined in the game.

8. The method of claim 3, wherein the switching to the new data center includes, pausing play of the game at the data center, the pausing identifies a restart point for resuming play of the game;

loading a game state of the game of the user from the server at the data center to a server in the new data center by synchronizing game data between the data center and the new data center; and resume play of the game from the restart point at the new data center.

9. The method of claim 1, wherein the predefined metric includes a minimum connection speed required for streaming video frames of the game during play.

10. The method of claim 1, wherein associating user data to the instance includes, synchronizing the user data of the user from different data centers used to service the prior requests for the game received from the user, the synchronizing causes updating of game state of the game and the user data of the user.

11. The method of claim 1, wherein the use history is maintained at the cloud gaming system and wherein analyzing use history includes identifying predictive attributes of game play of the user, the predictive attributes used in identifying the game and the data center.

12. The method of claim 11, wherein identifying predictive attributes of game play includes, identifying a relative weight for each predictive attribute of the user based on a certainty value, the certainty value of each predictive attribute determined from the gaming preferences of the user gathered from prior game play sessions in the use history.

13. A non-transitory computer-readable storage medium having computer executable instructions stored thereon, which when executed causes a computer system to carry out a method, the computer readable storage medium including:

program instructions for receiving a request for accessing a cloud gaming system, the request originating from a user;

program instructions for analyzing use history of the user, in response to the request, to predict usage of a game and to identify a data center that was last used to play the game by the user, the identified data center having an instance of the game loaded on a server of the data center and available for assignment to the user;

program instructions for assigning the instance of the game to the user, the assigning causing user data of the user to be associated with the instance of the game to enable interactivity with the game via a client device; and program instructions for verifying performance level of a communication channel established between the server and the client device to confirm that the performance level meets a predefined metric for playing the game, the performance level being verified after initiating the play of the game, wherein program instructions for verifying performance level includes program instructions for monitoring connection attributes of the communication channel established between the server and the client device, by performing a latency test using video frames generated during play of the game, the latency test performed in background during play of the game.

14. The computer-readable storage medium of claim 13, wherein program instructions for verifying performance level includes program instructions for generating a signal to the server of the cloud gaming system to switch the data center assigned to the user for playing the game to a new data center, when the performance level of the communication channel does not meet the predefined metric.

15. The computer-readable storage medium of claim 14, wherein the new data center is identified based on a current geo location of the user initiating the request, and availability of an instance of the game at a server of the new data center for assigning to the user.

16. The computer-readable storage medium of claim 14, wherein program instructions for generating a signal includes, program instructions for determining a quality of connection of the communication channel by comparing the connection attributes against the predefined metrics, the quality of connection determined by taking into account a threshold of latency defined for the game, wherein the signal generated to switch to the new data center is based on the quality of connection.

17. The computer-readable storage medium of claim 14, wherein program instructions for verifying performance level includes, program instructions for pausing play of the game at the data center and identifying a restart point for resuming play of the game;

program instructions for loading a game state of the game of the user from the server at the data center to a server in the new data center that includes an instance of the game for assigning to the user, by synchronizing game data between the data center and the new data center; and program instructions for resuming play of the game from the restart point at the new data center.

* * * * *